United States Patent [19]
Nakamoto

[11] Patent Number: 5,222,026
[45] Date of Patent: Jun. 22, 1993

[54] APPARATUS FOR OUTPUTTING DATA CORRESPONDING TO A METAL MOLD OF A DIE CASTING MACHINE AND METHOD FOR OUTPUTTING THE DATA THEREFOR

[75] Inventor: Toshinori Nakamoto, Kanagawa, Japan

[73] Assignee: Toshiba Kikai Kabushiki Kaisha, Tokyo, Japan

[21] Appl. No.: 635,229

[22] Filed: Dec. 28, 1990

[30] Foreign Application Priority Data

Dec. 28, 1989 [JP] Japan ................. 1-338117

[51] Int. Cl.⁵ .............................. G06F 15/46
[52] U.S. Cl. ...................... 364/476; 364/188
[58] Field of Search ........... 364/476, 188, 189, 473, 364/146

[56] References Cited

U.S. PATENT DOCUMENTS

| | | |
|---|---|---|
| 4,674,053 | 6/1987 | Bannai et al. ............ 364/476 |
| 4,774,675 | 9/1988 | Kagawa .................... 364/476 |
| 4,802,097 | 1/1989 | Tanaka et al. ............ 364/476 |
| 4,841,459 | 6/1989 | Ikeda et al. .............. 364/476 |
| 5,005,116 | 4/1991 | Fujita et al. .............. 364/188 |
| 5,062,052 | 10/1991 | Sparer et al. ............. 364/473 |
| 5,062,053 | 10/1991 | Shirai et al. ............. 364/476 |

Primary Examiner—Jerry Smith
Assistant Examiner—Paul Gordon
Attorney, Agent, or Firm—Cushman, Darby & Cushman

[57] ABSTRACT

An arrangement for automatically providing data for controlling a die casting machine that would otherwise have to be entered by an operator each time a mold of the die casting machine is changed. In a first embodiment, the operator inputs only data indicating which mold is to be used and the appropriate operational data is retrieved and sent to the die casting machine. In a second embodiment, the identification of the mold is handled automatically, to totally eliminate the need for an operator to input data.

8 Claims, 5 Drawing Sheets

APPARATUS FOR OUTPUTTING DATA CORRESPONDING TO A METAL MOLD OF A DIE CASTING MACHINE AND METHOD FOR OUTPUTTING THE DATA THEREFOR

BACKGROUND OF THE INVENTION

1. Field of the Invention

This invention relates in general to control of a die casting machine.

More specifically, this invention relates to controlling a die casting machine using data previously derived and stored corresponding to a metal mold of the die casting machine.

2 Description of Related Art

FIG. 6 (PRIOR ART) is a block diagram of a die casting machine system. The system includes a main controller 20 including a sequence controller (not shown in this figure), a process controller 90, and a die casting machine 10. Such a system may be used, for example, in aluminum die casting. The sequence controller could be implemented using a micro-processors. In such a case, the micro-processor could directly control die casting machine 10. Main controller 20 manages various operations including the start of operation, various control timings during the die casting process and the like. Process controller 90 monitors the process status of die casting machine 10. For example, it may monitor such parameters as injection speed of molten metal, speed of an injection plunger (this may include a low speed injection process and/or a high speed injection process), pressure of molten metal, pressure during an intensification process or in holding pressure process, temperature of a metal mold, etc.

Process controller 90, may also be implemented using a micro-processor and could directly output signals indicating status. These signals are called, "injection cycle signal", "intensification signal" and the like. In such cases main controller 20 may not be able to detect the true status of die casting machine 10. Thus, main controller 20 and process controller 90 may share certain functions with each other.

To manufacture different products, the metal molds used in the die casting machine are changed (each product manufactured has its own unique metal mold). The die casting operation may have different parameters for each product manufactured. For example, plunger speed may be faster for product A than for product B. Thus, for each product manufactured, there is a unique set of data corresponding to the various parameters under which die casting should take place. Various parameters that may be changed, from product to product include, but are not limited to the following: injection speed, injection pressure, temperature of metal mold, pressure of molten metal, time period of processes and the like.

In known die casting arrangements, main control equipment does not automatically have the data defining the various parameters of die casting operation. An operator of the die casting machine must set the data each time a new product is to be manufactured. Thus, it is rather inconvenient and inefficient to change metal molds and begin to produce a new product.

There may be some situations in which the appropriate data are already set in the main control equipment for sequence control, however, such situations are rare. Typically, when changing from one mold to another, much time and effort must be expended to set the data appropriate for die casting with the new mold.

Thus, it is desirable to provide an arrangement that would output data appropriate to a particular mold or set of molds, which data could automatically be utilized in controlling a die casting operation.

SUMMARY OF THE INVENTION

It is an object of the present invention to provide an arrangement for outputting data corresponding to a particular metal mold utilized in a die casting machine.

According to one aspect of this invention, there is provided an apparatus for outputting data corresponding to a metal mold of a die casting machine having a main controller. The apparatus includes first inputting means for inputting operation control data corresponding to a metal mold classification, second inputting means for inputting the metal mold classification, memory means for storing the operation control data input from the first inputting means, and outputting means for outputting the operation control data corresponding to the metal mold to the main controller.

According to another aspect of the invention, there is provided a method for outputting data corresponding to a metal mold of a die casting machine having a main controller, the method comprising the steps of:

inputting operation control data corresponding to a metal mold classification for control with the metal mold before operation of the die casting machine, storing the operation control data for the die casting machine, inputting the metal mold classification, recognizing the metal mold classification, and outputting the operation control data corresponding to the metal mold classification to the main controller.

BRIEF DESCRIPTION OF THE DRAWINGS

The invention will be described in greater detail with reference to the accompanying drawings in which.

DETAILED DESCRIPTION OF THE PREFERRED EMBODIMENTS OF THE INVENTION

Preferred embodiments of the present invention will now be described in more detail with reference to the accompanying drawings.

Figure 1:
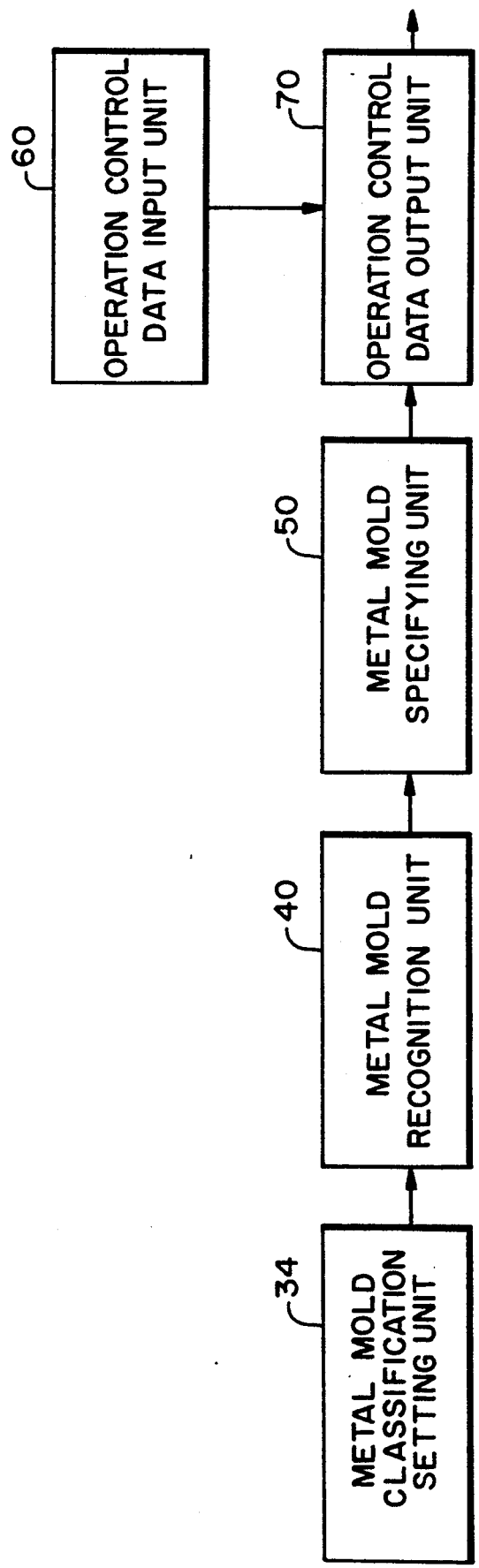
FIG. 1 is a block diagram of the apparatus for outputting data corresponding to a metal mold of the die casting machine according the present invention.

FIG. 1 is a block diagram of the apparatus for outputting data corresponding to a metal mold of the die casting machine according the present invention. An operation control data input unit 60, a metal mold specifying unit 50 and an operation control data output unit 70 are minimum required blocks. A metal mold classification setting unit 34 and a metal mold recognition unit 40 are optional blocks.

Operation control data input unit 60 is used for inputting data corresponding to a metal mold. Metal mold specifying unit 50 is used for specifying the metal mold classification. Operation control data output unit 70 includes a memory for storing data input via operation control data input unit 60. Operation data output unit 70 outputs the operation data stored in its memory to main control equipment having a sequence controller of a die casting machine (not shown in this figure).

Preferably, there are provided a metal mold classification setting unit 34 and a metal mold recognition unit 40 to provide added functionality.

Operation control data corresponding to a metal mold is input to a memory area of operation control data output unit 70 using operation control data input unit 60.

When the metal mold of a die casting machine is changed, data indicating a classification of the metal mold is input from the metal mold specifying unit 50 to operation control data output unit 70.

The operation control data output unit 70, receiving data from both operation control data input unit 60 and metal mold specifying unit 50, outputs data to a die casting machine control apparatus which controls a die casting machine.

Once data for a particular type of metal mold has been entered, it need not ever be re-entered. When a metal mold is changed, it is necessary only to indicate only metal mold classification data. Operation control data corresponding to the metal mold is automatically retrieved and provided to control the die casting machine control apparatus.

When there is provided metal mold classification setting unit 34, a metal mold classification can be automatically recognized using metal mold recognition unit 40. This eliminates the need for an operator to even input the metal mold classification. Operation control data output unit 70 can output operation control data which correspond to the metal mold being used in the die casting machine for controlling the die casting operation based on information which is contained in metal mold classification setting unit 34.

First Embodiment

Figure 2:
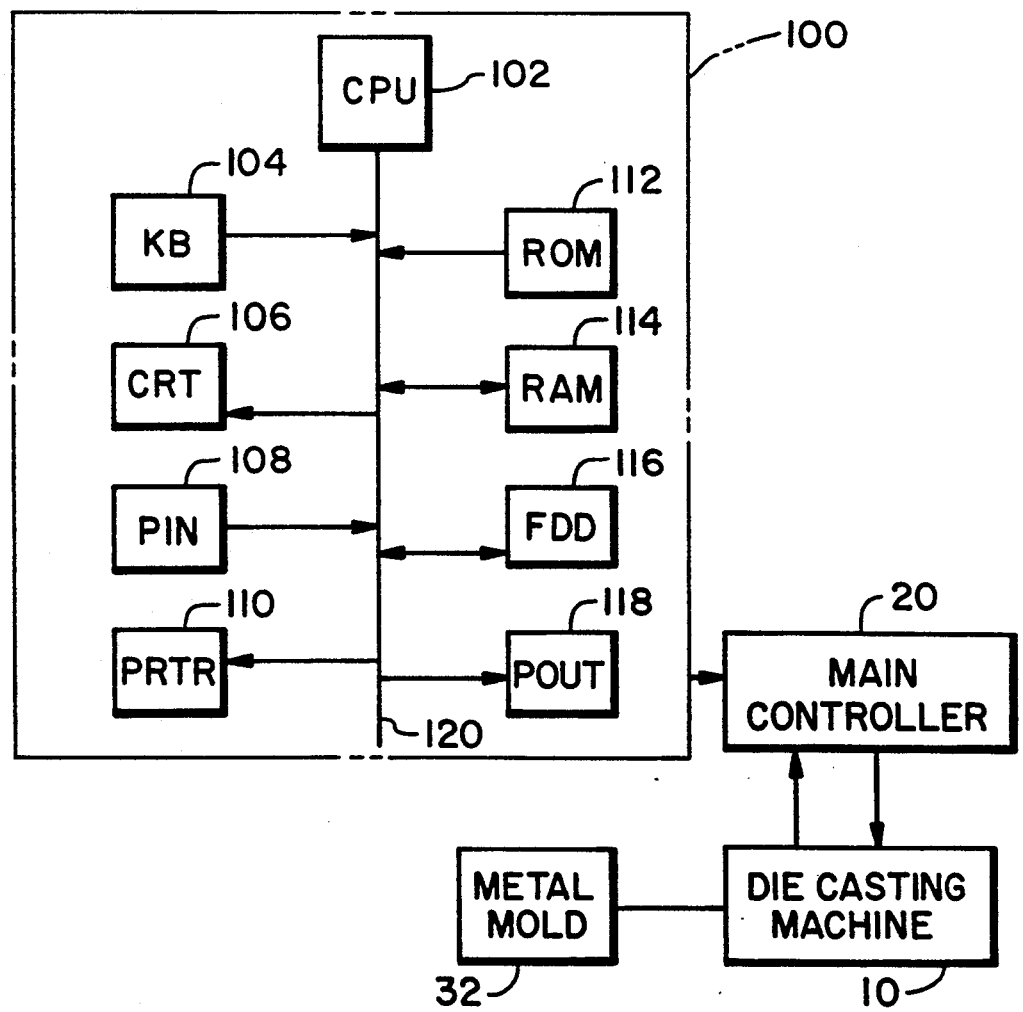
FIG. 2, is a block diagram of a first embodiment in the present invention.
Figure 6:
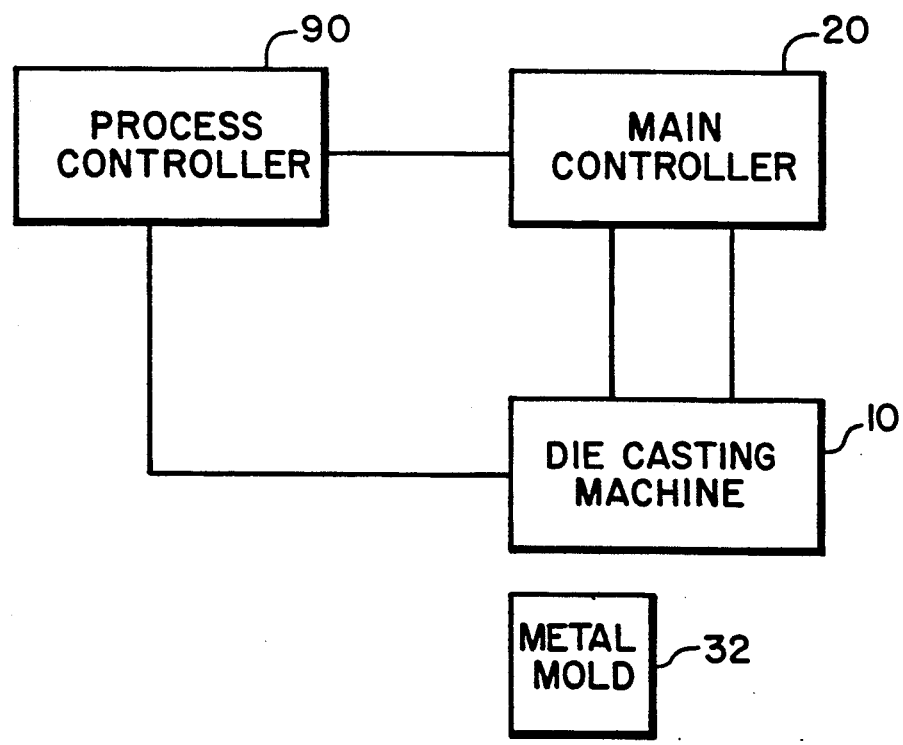
FIG. 6 (PRIOR ART) is a block diagram of a control system diagram in a known die casting machine.

FIG. 2 is a block diagram of a first embodiment in the present invention. It shows an apparatus for outputting data corresponding to a metal mold 32 being used in a die casting machine 10. A main controller 20 receives data from a data outputting apparatus 100. Die casting machine 10, main controller 20, and metal mold 32 are identical to and operate in the same manner as in known die casting machines, such as shown in FIG. 6 (PRIOR ART) so detailed description is omitted. Main controller 20 is preferably microprocessor based and operates like a sequence controller. Data outputting apparatus 100 is also micro-processor based. Data outputting apparatus 100 includes a CPU 102, key-board (KB) 104 CRT 106, process input unit (PIN) 108, printer 110 (PRTR), ROM 112, RAM 114. Also data outputting apparatus has a flexible disk drive (FDD) 116, process output unit (POUT) 118 and connected each other via bus line 120.

A control program for operating data outputting apparatus 100 is stored in ROM 112. CPU 102 operates in accordance with the control program stored in ROM 112. RAM 114 is a read/write memory that is used as a temporary memory for storing data processed by CPU 102. KB 104 performs the function of operation control data input unit 60 shown in FIG. 1.

Operation control data corresponding to a metal mold are input via KB 104. CPU 102 runs an interactive data entry program allowing the operator to easily input data via KB 104. Messages are displayed to the operator via CRT 106. Data input by the operator are stored to FDD. These data may include, but are not limited to: temperature of the mold, injection speed, injection pressure, pressure in the holding pressure process, and period of holding pressure process. The data input from KB 104 may be output in hard copy using printer 108 for confirmation.

Data corresponding to a metal mold are stored to FDD 116. After the data is stored, metal mold(s) to be used in a die casting process are applied to the die casting machine. Classification data corresponding to a metal mold is input from KB 104. Accordingly KB 104 functions as both the operation control data input unit 60 (FIG. 1) and as a metal mold classification setting unit 34 (FIG. 1).

CPU 102 selects the data corresponding to the metal mold which is stored in FDD and outputs the data to main controller 20 via POUT 118. Accordingly CPU 102 and POUT 118 perform the functions of operation control data output unit 70 shown in FIG. 1.

There are two different procedures for outputting the selected data to main controller 20. One procedure is to output data as a single package (all data is output at the same time). A second procedure is to output data in accordance with the status transition of the die casting machine.

According to the first procedure, data is handled substantially as it is in the conventional arrangement, as shown in FIG. 6. Data is output when the mold is changed.

According to the second procedure, for example, data relating to the injection plunger position and the speed thereof for the low speed injection process are output first and then the data for the high speed injection process are output next to main controller 20. Main controller first controls in accordance with the low speed data, and then in accordance with the high speed data. Main controller 20 does not store all of the data at one time, so that the storage area in the main controller may be made smaller than it is in the prior art.

According to the present invention, when a metal mold is changed, the operator inputs only data specifying the metal mold classification via KB 104. Thus, it is not required that the operator input the complex set of data required by the prior art devices. Thus, the die casting machine can be operated essentially unmanned.

In manufacturing situations where there are many die casting machines or die casting machines that have molds changed frequently, the approach set forth by the present invention increases efficiency greatly. The present invention also leads to increased accuracy. According to the prior art, each time an operator must key in complex data, there is potential for error. According to the present invention, data for a given mold is input only one time. If input correctly, it will be correct each time it is automatically retrieved for use with a changed mold.

Second Embodiment

A second preferred embodiment of the present invention will now be described in detail with reference to the FIG. 3.

This embodiment is substantially the same as that shown in FIG. 2, except that there is also provided a metal mold recognition unit 40. Metal mold recognition unit 40 automatically recognizes a mold attached to a die casting machine and outputs data indicative thereof. This data is coupled to PIN 108. PIN 108 performs the function of metal mold specifying unit 50 in FIG. 1. A metal mold classification specifying unit 34 is provided on metal mold 32 to specify a metal mold classification for the mold.

Figure 4:
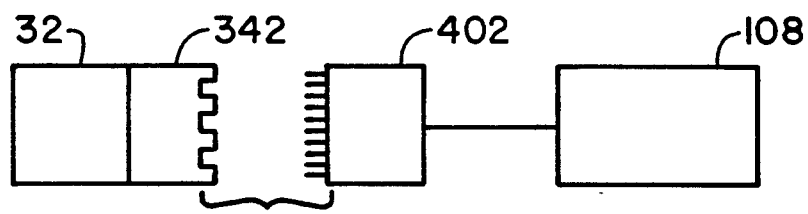
FIG. 4 shows a first example of a metal mold classification setting unit and the metal mold classification distinction unit in the FIG. 3.

One example of metal mold classification specifying unit and metal mold recognition unit are shown in FIG. 4. A concave-convex element 342 is provided on the exterior of metal mold 32. The shape of element 342 corresponds to the metal mold classification.

Metal mold recognition unit 40 is provided with a group of limit switches 402 to detect the concave-convex shape of concave-convex part 342 on the metal mold 34. The group of limit switches 402 is fixed near metal mold 32 in die cast machine 34. When metal mold 34 is changed, the convex part of concave-convex part 342 touches the limit switches which correspond to that convex part and causes them to close. The remaining limit switches remain open. The status of the various limit switches are input to PIN 108 and ultimately sent to CPU 102. The status signal of the limit switches constitutes a digital signal indicating the particular classification of the mold attached to the die casting machine.

CPU 102 outputs the digital signal which is stored in FDD 116, to main controller 20 for die casting machine 10 via POUT 118. Then the main controller 20 is operated with the data output from POUT and the operation of the main controller is, from that point, substantially the same as the first embodiment.

Figure 5A:
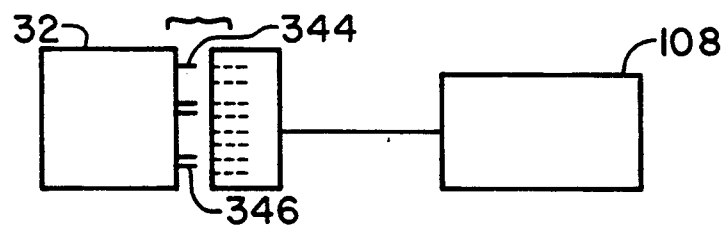
FIG. 5 (*a*) and FIG. 5 (*b*) show a second example of the metal mold classification setting unit and the metal mold classification setting unit.
Figure 5B:
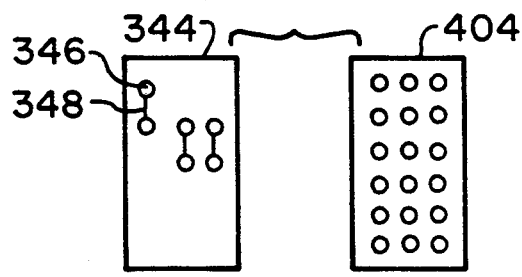

A second example of metal mold classification specification setting unit 34 and corresponding metal mold recognition unit 40 is shown in FIG. 5 (a) and FIG. 5 (b).

In FIG. 5 (a) and FIGURE (b), short circuit 344 is provided at the outside of metal mold 32 as metal mold classification specification unit 34. FIG. 5 (a) is a side view and FIG. 5 (b) is a plan view.

Short circuit 344 includes projections 346 and connection part 348 which connects projections therebetween. These projections 346 and connection parts 348 are fixed to metal mold 32 along with an approprite insulation member. Metal classification recognition unit 40 is realized as connector 404 having holes which may be inserted by projections 346. That is, short circuit 344 functions as an male connector, and connector 404 functions as an female connector which cooperates with the male connector. Projections 346 of short circuit 344 and connection part 348 are arranged beforehand, and recognize each metal mold.

When an operator changes the metal mold, short circuit 344 is connected to connector 404 by the operator. A DC voltage is applied to the holes of connector 404 and signals corresponding to the metal mold are detected by the short circuits which are formed by the projections and the connection part. That is, the holes which are short circuited cause a logical "1" signal input, and the holes which are not short circuited cause a logical "0" signal input. The input status of these signals shows the metal mold classification.

CPU 102 recognizes the signals via PIN 108 and outputs operational data corresponding to the metal mold classification to main controller 20 of die casting machine via POUT 118 with serial data or parallel data.

Metal mold classification specification unit 34 and metal mold classification recognition unit 40 are not limited to the above mentioned structure, and several variety could be available. For example, bar codes may be applied and set on metal mold 32, which are read by an optical reader device. Metal mold classification recognition unit would be an input device which inputs such bar codes.

Figure 3:
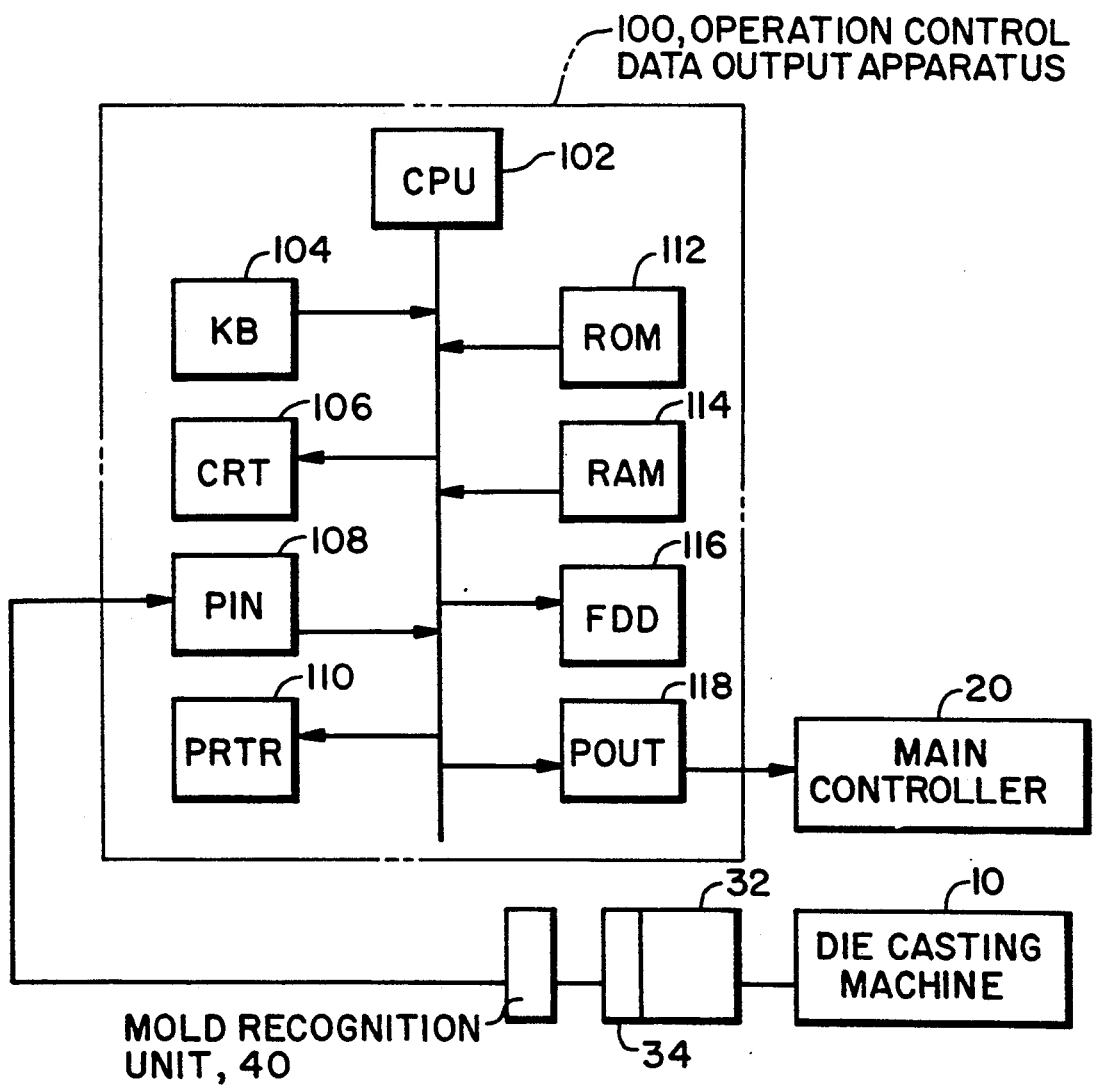
FIG. 3 is a block diagram of a second embodiment in the present invention.

Data outputting apparatus 100, shown in FIG. 2 and FIG. 3 may have other forms as well. For example, FDD 116 could be changed to semiconductor bulk memory or tape recording system or IC card or the like. Also data outputting apparatus 100 may be constructed for only one die casting machine, or many die casting machines.

As described above, according to the present invention, the operation control data is input beforehand and the operator only inputs metal mold classification data when a metal mold is changed. Corresponding data are automatically sent to the main controller of the die casting machine. Control data, which has been confirmed sufficiently beforehand are output to control the die casting machine. Thus, this invention provides for enhanced efficiency and enhanced accuracy.

Moreover, a metal mold classification specification unit and metal mold classification recognition unit may be provided to further minimize the need for operator involvement. The operation control data are automatically output to the main controller of the die casting machine. This results a prevention of error data setting.

In summary, this invention provides an die casting machine control arrangement having an apparatus for outputting data that would normally be input by an operator, thereby truly achieving unmanned operation of a die casting machine.

What is claimed is:

1. An apparatus for providing data corresponding to a die casting machine metal mold for use by a main controller of the die casting machine for controlling its operation, comprising:

input means for operator inputting operation control data corresponding to each type of metal mold to be used in the die casting machine;

specifying means for manually specifying which metal mold is to be used for a given operation of the die casting machine;

memory means for storing the operation control data input by the operator; and output means for outputting the operation control data previously stored in the memory means and corresponding to the metal mold specified by the specifying means to the main controller;

metal mold classification setting means, attached to the metal mold, for identifying the metal mold; and metal mold classification recognition means for automatically recognizing the metal mold classification specified by the metal mold classification setting means.

2. An apparatus according to claim 1, wherein the metal mold classification setting means includes a concave-convex element attached on the metal mold.

3. An apparatus according to claim 2, wherein the metal mold classification recognition means includes a limit switch attached near the metal mold, and actuatable by the concave-convex element.

4. An apparatus according to claim 1, wherein the metal mold setting means includes a short circuit having an electric wire.

5. An apparatus according to claim 4, wherein the metal mold recognition means includes a connector acting with the short circuit so as to decode the metal mold classification.

6. An apparatus according to claim 1, wherein the memory means includes a semiconductor memory.

7. An apparatus according to claim 1, wherein the memory means includes an IC card memory.

8. An apparatus according to claim 1, wherein the memory means includes a flexible disk arrangement.

* * * * *